Patented Dec. 27, 1932

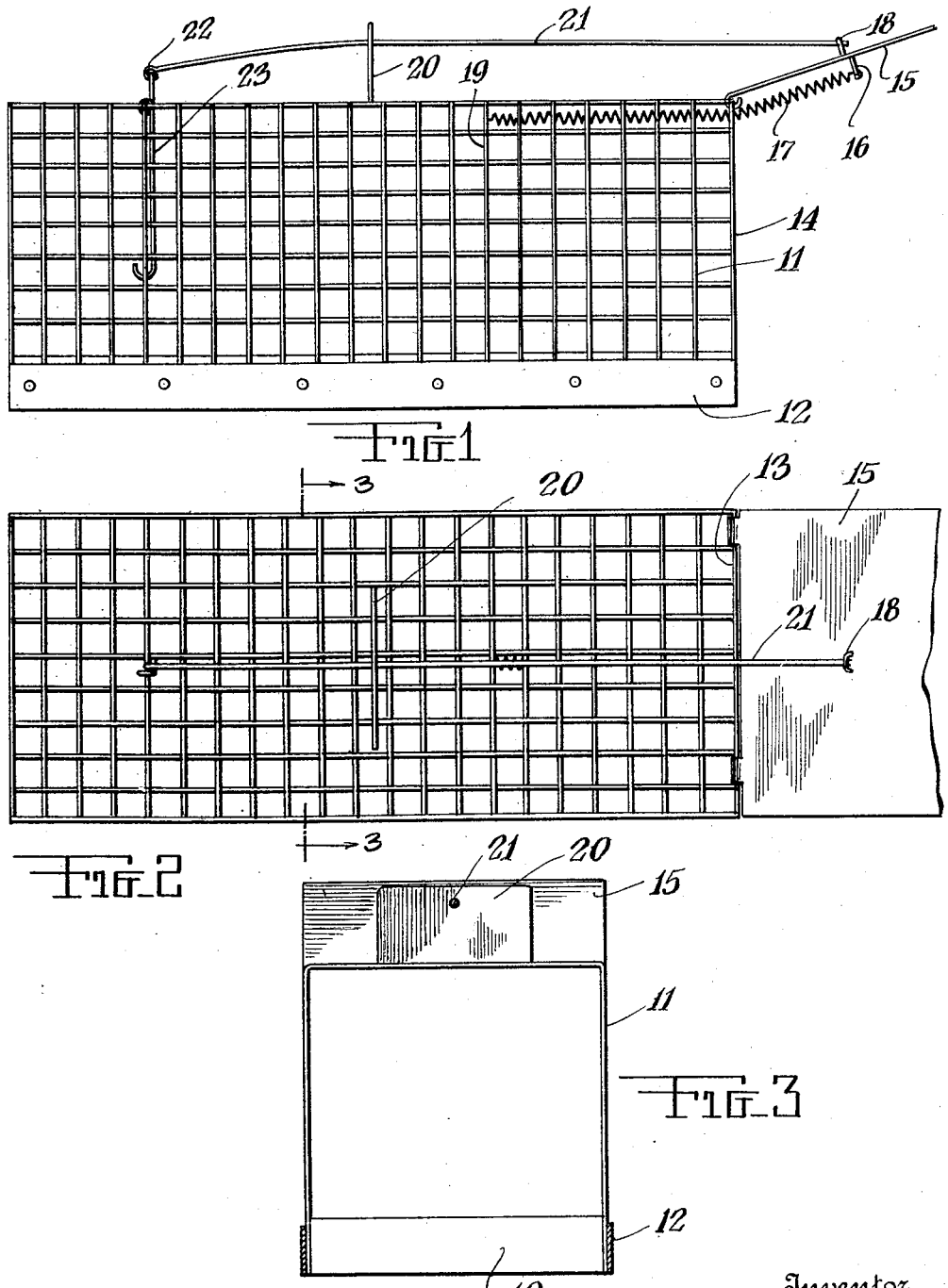

1,892,423

UNITED STATES PATENT OFFICE

ROCCO D'AMATO, OF NEW YORK, N. Y.

TRAP

Application filed February 18, 1929, Serial No. 341,014. Renewed November 3, 1932.

The main object of this invention is to provide an animal trap which is simple in construction and inexpensive in cost of manufacture, thereby making it an article which may be used in every household and by people requiring such devices without an unreasonable outlay.

Another object of this invention is to provide a novel animal trap in which a door is suspended from a slide bar having a bait hook connected thereto, which latter, when swung through a small arc, actuates the lever to release the trap door and permit the latter to close.

The above and other objects will become apparent in the description below, in which characters of reference refer to like-named parts in the drawing.

Referring briefly to the drawing, Figure 1 is a side elevational view of the animal trap.

Figure 2 is a top plan view of the same.

Figure 3 is a sectional elevational view of the animal trap, taken on line 3—3 of Figure 2.

Referring in detail to the drawing, the numeral 10 indicates the base, which serves as the bottom of the trap. This base is surmounted by a U-shaped grille structure 11 which is open at one end and is secured in place to the base by employing securing straps 12. The upper portion 13 of the rung 14, which bounds the open end of the grille structure, has a trap door 15 hingedly suspended therefrom. This trap door has an eye 16 on its inner side to which one end of a coil spring 17 is secured. The opposite side of the trap door 15 is provided with an eyelet 18 for a purpose which will be more fully hereinafter described. The spring extends parallel to the trap door 15 when the latter is retained in open position and is supported intermediate its length upon the rung 13, then changes its course to travel horizontally and parallel to the roof of the grille work, and is secured to one of the intermediate rungs 19 of the cage structure. The intermediate portion of the cage structure supports an upright panel 20 in which an opening, midway of its length, is provided. This opening slidably receives a bolt 21 which extends substantially horizontal above the cage and its extreme end is adapted to be engaged in the eyelet 18 of the trap door 15. The opposite end of the bolt 21 is curved downwardly in a slender fashion and has a loop 22 at this downwardly curved end. This loop is directly connected, in a pivoted manner, to a hinged bait hook 23 which is suspended through the roof of the cage and lies within the interior thereof.

The trap is used in the following manner: (for rodents and all other animals which are capable of being captured with this type of trap). The hook 23 is provided with the usual type of bait, such as bacon, suet or other substance which will entice an animal, particularly a rat. After the hook 23 is baited the bolt 21 is shifted toward the closed end of the cage and the door 15 is lifted until the eyelet 18 becomes aligned with the end of the slide bolt 21. When this occurs the bolt 21 is shifted in the reverse direction until it assumes the position, after passing through the eyelet, where the trap door will hang suspended from the end of the bolt. In actual operation the animal enters the open end of the trap, feeds upon the bait, and in so doing, disturbs the hook 23, pulling the latter toward the open end of the cage. This action will retract the bolt 21 out of the eyelet and permit the spring 17 to function by drawing the trap door 15 to the closed position.

It is to be noted that certain changes in form and construction may be made without departing from the spirit and scope of the invention.

I claim:

A trap comprising a cage having a roof, a door hingedly attached to the roof to close the cage, an eyelet on said door, a rod slidably mounted on the cage and having one end engaging said eyelet to retain the door in open position, bait carrying means attached to the other end of said rod, said rod being slidably disengaged from engagement with said eyelet upon disturbance of the bait-carrying means, said door in open position lying at an obtuse angle to the open end of the cage, a coiled spring attached at one end to the roof of the cage and at the other end to said door, said spring when the trap is set extending along the roof a part of its length and along the door the other part of its length, the latter being bent about the edge of the roof at the open end of the cage so that said parts of the spring form an obtuse angle therebetween.

In testimony whereof I affix my signature.

ROCCO D'AMATO.